US009640020B2

(12) United States Patent
Sum

(10) Patent No.: US 9,640,020 B2
(45) Date of Patent: May 2, 2017

(54) ADVANCED GAMING CABINET STRUCTURE

(71) Applicant: Benny Sum, Las Vegas, NV (US)

(72) Inventor: Benny Sum, Las Vegas, NV (US)

(73) Assignee: NATIVE GAMES AMERICA LLC, Las Vegas, NV (US)

( * ) Notice: Subject to any disclaimer, the term of this patent is extended or adjusted under 35 U.S.C. 154(b) by 213 days.

(21) Appl. No.: 14/636,187

(22) Filed: Mar. 3, 2015

(65) Prior Publication Data

US 2016/0256785 A1 Sep. 8, 2016

(51) Int. Cl.
*A63F 13/00* (2014.01)
*G07F 17/32* (2006.01)

(52) U.S. Cl.
CPC ................................ *G07F 17/3202* (2013.01)

(58) Field of Classification Search
None
See application file for complete search history.

(56) References Cited

U.S. PATENT DOCUMENTS 6,201,703 B1 * 3/2001 Yamada .................. G07F 17/32 220/4.02
6,454,649 B1 * 9/2002 Mattice ............... G07F 17/3209 463/16
6,491,298 B1 * 12/2002 Criss-Puszkiewicz G07F 17/3202 273/148 R
8,439,761 B2 * 5/2013 O'Keene ................. G07F 17/32 463/46
2004/0018877 A1 * 1/2004 Tastad ..................... G07F 17/32 463/46
2004/0053699 A1 * 3/2004 Rasmussen ......... G07F 17/3216 463/46
2008/0311976 A1 * 12/2008 Hashimoto ......... G07F 17/3216 463/20
2009/0005178 A1 * 1/2009 Abe .................... G07F 17/3216 463/46
2009/0280911 A1 * 11/2009 Tsao ........................ G07F 17/32 463/46
2010/0099502 A1 * 4/2010 Cole ....................... G07F 17/32 463/46

(Continued)

FOREIGN PATENT DOCUMENTS

JP WO2013/136609 * 9/2013 ............... A63F 9/00

*Primary Examiner* — Jason Yen
(74) *Attorney, Agent, or Firm* — Mark A. Litman & Associates, P.A.

(57) ABSTRACT

An electronic gaming cabinet for electronic gaming components with:
a main structural frame having a top, bottom, two opposed sides, a back, an open front and internal volume;
a front cover frame hinge on one opposed side;
the front cover frame having three openings, one for a top video display, one for a bottom video display and one for a player input panel, and the front cover frame freely opening from its closed position;
the internal volume having a first support for the top video display that allows slideable insertion and removal of the top video display monitor, and a second support for the bottom video display allowing slideable insertion and removal of the bottom video display monitor; and
the internal volume having a processor supporting structure located lower within the internal volume than the top video display and at an equal or lower height than the bottom video display.

19 Claims, 3 Drawing Sheets

(56) References Cited

U.S. PATENT DOCUMENTS

| | | | | |
|---|---|---|---|---|
| 2011/0136573 | A1* | 6/2011 | McComb ................ | A63F 13/08 463/31 |
| 2015/0302683 | A1* | 10/2015 | Matsushita ......... | G07F 17/3227 463/31 |

* cited by examiner

ADVANCED GAMING CABINET STRUCTURE

BACKGROUND OF THE INVENTION

1. Field of the Invention

The present invention relates to the physical structure of gaming apparatus cabinets, especially gaming cabinet apparatus with player input panels and either large display screens or multiple display screens.

2. Background of the Art

This invention relates to cabinets or boxes for gaming machines such as video slot machines. More particularly, the present invention relates to gaming machines having a main display for presenting primary game play and a second display for either outcome information, advertising or game identification information, secondary game play, additional base game play information or for displaying any additional secondary information.

Gaming machines such as slot machines and video poker machines are extremely popular. Part of the reason for their popularity is the nearly endless variety of games that can be implemented on the gaming machine. “Secondary game events” have been provided as a variation on some gaming machines. As used herein, “primary game information” includes, for example, information about numerous stages of game play such as (1) a “currency in” stage in which the machine awaits a coin or bill insertion to initiate a play, (2) a “game play” stage in which the player has initiated a play (e.g., spinning reels on a slot machine), and (3) a “game result” stage in which a payout or no-payout event is registered. Other primary events include general gaming machine state changes such as malfunction (e.g., a tilt). As used herein “secondary game information” includes information about slot tournaments, progressive games, bonus schemes, and other incentives for maintaining a player’s interest or to play in a particular manner. In one example, a progressive game allows jackpots to be pooled over multiple slot machines. At some location, the sum of the pooled jackpot (secondary information) is displayed to players and potential players.

The gaming cabinet also contains a player input panel which is placed below or between display surfaces, such as a button panels, ticket-in-ticket-out acceptor/printers, currency acceptors, player card or credit card readers, and the like.

Each of the primary game events results in displayed information, conventionally presented to the gaming machine user via a main display (e.g., the reels display in a slot machine or the video display systems in a video poker game). Some primary game information may also be displayed via light source regions that light up on the gaming machine glass when a particular primary game event occurs. The secondary information may also be displayed via such lighted regions on the gaming machine glass. Unfortunately, the potential of secondary games has been largely unrealized because the display vehicle for secondary game events (lights or sounds emanating from the gaming machine) greatly limits the attraction and sophistication of such games. Sometimes, as in the case of progressive slot games, the secondary information is presented in a large specially created display occupying significant space in a central location of the casino.

The internal configurations and cabinet structures have changed little over the years, even though many disclosures have provided claims of significant improvements and advancements. Cabinet structures presently in use are difficult to repair and opening of cabinets can damage elements inside and outside the cabinet box. The following U.S. Patent documents evidence many of the structures, uses and components devised for use in gaming cabinets for either mechanical reel slots or video gaming apparatus.

U.S. Pat. No. 8,842,156 (Alekhin) describes a public standalone information access tool, such as bidirectional video terminal/kiosk for receiving a variety of services and for information exchange. The kiosk is connected to a plurality of remotely located representatives/operators specializing in different services. The customer receives help and share documents with at least one operator. The kiosk provides people from small remote villages an opportunity to receive all services available in a large city.

U.S. Pat. No. 8,740,706 (Klein) describes a gaming machine has a flat panel display screen that is pivotable over a range of angles to allow the player to tilt the screen to directly face the player. The screen also can be pulled toward the player for maximum comfort. The screen has user interface controls, such as part of a touch screen. The screen contains one or more accelerometers for detecting movement of the screen. The player grips the screen with both hands to control the game via movement of the screen (e.g., shaking, tilting, pushing in, or pulling out) and the touching of the user interface controls. The screen may include a vibrator for providing tactile sensations to the player. The screen allows a player to completely control a game, including wagering and carrying out the game, without releasing the screen from the player’s two-handed grip. A curved forward-facing front panel is shown.

U.S. Patent Application Publication No. 20100120530 (Lesley) describes a gaming terminal that includes a gaming cabinet, at least one display, an adjustable playing area, and a player-input button. The at least one display is mounted to the gaming cabinet and configured to display a randomly selected outcome from a wagering game. The randomly selected outcome is selected from a plurality of outcomes in response to receiving a wager input from a player. The adjustable playing area is mounted to the gaming cabinet below the at least one display. The adjustable playing area is operable to translate linearly between a proximal position and a distal position, the proximal position being near the gaming cabinet and the distal position being away from the gaming cabinet. The player-input button is mounted in the adjustable playing area for receiving game play input from the player. A curved forward-facing front panel is shown.

U.S. Patent Application Publication No. 20090264195 (Kompella) discloses methods for tailoring a gaming machine to a player. According to one method, a first gaming machine receives a player input via a player interface to tilt a display. The display pivots about a horizontal axis of the display in response to the player input from the player interface, and data related to the position of the display is saved. The data is then associated with a player identifier for future use on the first gaming machine or a gaming machine having a similar display configuration.

U.S. Patent Application Publication No. 20030060270 (Binkley) describes a gaming terminal that includes at least one articulating element. The articulating element may be a monitor that may be moved along one or more axes, either automatically or by a gamer. A flat panel display may be used as the monitor of such a gaming terminal to facilitate articulation thereof. Due to the use of a flat panel display, the gaming terminal may be relatively compact when compared with conventional gaming terminals. Further compactness of the gaming terminal may be achieved by omitting elements for receiving, retaining, and dispensing currency. The gaming terminal may be part of a gaming network, which may also include on or more of a network server and an automated cashier. Methods for adjusting an articulating element of the gaming terminal are disclosed, as are methods for using a cashless gaming system.

U.S. Pat. No. 8,715,058 (Pennington) discloses gaming machines that include two or more game presentation devices such as rotating reels, video display screens, touch screens, etc. One or more of these game presentation devices can be moved into and out of position with respect to other game presentation devices. This may allow, among other things, flexibility in presenting different types of games or different game features within a single game. The generic cabinet is disclosed in FIGS. 1 and 6A.

U.S. Pat. No. 5,951,397 (Dickinson) describes an improved gaming machine having a touch screen applied to an outer face of a CRT display and a limited number of push-button actuators. Either the touch screen or the push-button actuators can be used for controlling play as well as selecting one of several games that can be played on the machine. By using a touch screen on the video display device, the player of the game of the machine can use either the touch screen or the push-button actuators to change the playable game elements, such as discarding and drawing new cards when playing poker. The touch screen and associated electronics are arranged and programmed so that multiple touch fields are defined on the surface of the screen, which, by manually touching, can be used for playing games, such as keno, which require more actuators than there are push buttons on the machine. The touch fields on the touch screen are identified by generating appropriately located instruction images on the CRT display, which are visible through the transparent touch screen. The touch screen is directly applied; e.g. bonded, to the CRT screen. The patent describes a typical IGT gaming machine at the time of the invention which is broadly denoted by the numeral 10 and includes an outer housing 12 having a top door 14, central opening 16 and a bottom door 18. The housing is generally upright as shown in FIG. 1 and is adapted to be used to play a number of games, such as poker, blackjack and video slot machine. The machine includes a CRT display device 20 which is fitted with a touch screen 40, described in greater detail below. The housing further has a limited number; e.g. eight, push buttons 24. The touch screen is provided to enable play of games, such as keno, for example, which are not generally playable with the machine because keno needs many more push-button actuators that can be conveniently positioned on the machine. The top door 14 can be opened to allow entry to a space in the machine 10 for mounting the required equipment, such as electronic circuitry, of the machine. The central opening 16 carries the CRT display device 20 on which images of cards and/or other indicia of games playable on the machine are displayed.

U.S. Pat. No. 6,135,884 (Hedrick) discloses a gaming machine that includes main and secondary displays. Hedrick U.S. Pat. No. 6,575,541 describes translucent monitor masks, substrate and apparatus for removable attachment to gaming device cabinet The secondary display is disposed apart from the primary display and is used for presenting primary, secondary, or even tertiary information. The main display is controlled electronically by a gaming machine controller, which main display presents the results of a play on the gaming machine. In the case of a slot machine, the main display may be the glass display through which the spinning reels of a game play are viewed. In a video poker gaming machine, the main display is usually a cathode ray tube ("CRT") which displays a video game image to the player and other information directly associated with the game play. The secondary display may be provided at various locations on the gaming machine such as in a top glass portion of the gaming machine or a belly glass portion of the gaming machine, which belly glass portion is located below a main display portion of the gaming machine. The secondary display itself may be a liquid crystal display, a cathode ray tube, a field emission display, a plasma display, a digital micromirror device (DMD), etc. The secondary display is mounted on a secondary display support. The secondary display support is attached to the gaming machine chassis by a hinge in order to move the secondary display for access to maintenance. The gaming apparatus is shown with a fully removable front frame over multiple CRT screens.

U.S. Pat. No. 6,251,014 (Stockdale) discloses a gaming machine with a plurality of "gaming peripherals," each communicating with a master gaming controller via a standard peripheral interface such as the USB (Universal Serial Bus). Further, the gaming peripherals employ a standard peripheral controller and one or more specialized "peripheral devices" (e.g., the actual lights, bill validators, ticket printers, etc. that perform the specific functions of the gaming peripherals). Much of the hardware associated with the peripheral controller is identical from one gaming peripheral to the next. Only a portion of the peripheral controller hardware is specific to the different types of gaming peripherals. A cabinet locking construction is also shown.

machine comprising a first video-type display, a second video-type display and a controller. The second display is positioned adjacent the first display. A controller generates a unified image of a game of chance on the first and second displays. The unified image includes a first portion on the first display and a second portion on the second display. FIG. 1 shows the cabinet.

U.S. Pat. No. 6,646,695 (Gauselmann) describes an apparatus for positioning of a symbol display device on the door element of a casing of a coin actuated entertainment automat. The symbol display device at the coin actuated automatic entertainment wherein the symbol display device is furnished as a television monitor or as a roller shaped circulating body. The symbol display device exhibits conventionally a fixed position on the front side with the disadvantage that a stray light free observation of the symbol display device is not possible for each user of the coin actuated entertainment automat. This disadvantage is to be removed with the construction according to the present invention. The symbol display device is disposed vertically shiftable on the front side of the casing of a coin actuated entertainment automat for obtaining a reflection free view position of the symbol display device. The display screen is attached to the outer frame.

U.S. Pat. No. 6,659,864 (McGahn) describes a gaming device which awards an initial award to a player, discloses to a player that a higher valued enticement award is available and selectable, and enables the player to selectively swap the initial award for an opportunity to select the enticement award. The game preferably discloses the value of the initial award and the enticement award. The game masks the enticement award in a pattern along with one or more masked consolation awards, the consolation awards having values less than the value of the initial award. The game reveals the awards using a secondary display having mechanical doors that open and close.

U.S. Pat. No. 8,764,573 (Johnson) describes a gaming machine including a first cabinet including a first display for displaying a first game or information for the gaming machine, a second cabinet including a second display for displaying a second game, and a third cabinet including an input device for playing the game, wherein an area of a top surface of the third cabinet is wider than an area of a bottom surface of the second cabinet or a bottom surface of the first cabinet.

U.S. Pat. No. 8,641,534 (Hashimoto) describes a gaming machine that includes a cabinet having a front opening, a front door, a display device, an input device and a controller. The front door is pivotably coupled to the cabinet via a hinge that is attached to a lateral end portion at a front face of the cabinet, and opens and closes the front opening. The display device is placed in the front face of the cabinet. The input device allows a player to perform operation related to the game. The front door has an operation table that projects forward from the cabinet. The input device is placed on the operation table. A cutout is arranged such that a side portion of the operation table closer to the hinge has a recess. Individual frames with screens are removed for access.

U.S. Pat. No. 8,616,982 (Greenberg) describes a gaming terminal for conducting a wagering game includes a main body having a cabinet door and a top box positioned above the main body. The cabinet door has a closed position and an open position. The top box includes a crown that is moveable from a first position that prohibits access to the top box to a second position that provides access to the top box. The gaming terminal further includes a latching assembly for securing and releasing the crown. The latching assembly is configured to release the crown in response to the cabinet door being in the open position so as to permit movement of the crown from the first position to the second position. The latching assembly is further configured to secure the crown in response to the crown being moved from the second position to the first position when the cabinet door is in the closed position.

U.S. Pat. No. 8,016,683 (Cole) describes a gaming machine cabinet or housing constructed from a plurality of connected components. In one embodiment, the cabinet is assembled from base, side, top, back and door components or sections. The housing may have a basis configuration constructed from a base, sides, top, back and a first door. The housing may have a plurality of modified configurations constructed from various of the basic configuration components, such as the base, sides and back, and an extension and modified door. In accordance with the invention, the gaming machine housing may be manufactured in one location and then conveniently shipped in unassembled form to another location for assembly and use. The gaming machine housing may also be constructed in a variety of configurations utilizing a small number of components. The display screen is removed from the cabinet with the front panel.

U.S. Pat. No. 7,985,139 (Lind) describes a gaming machine having a cabinet defining an enclosure volume with a cabinet front opening. A main door is pivotally connected at its upper end to the cabinet so as to be pivotable with respect to the cabinet between a closed position and an open position. In the open position the lower end of the main door is pivoted upwardly and away from the cabinet to expose the enclosure volume in the main portion of the cabinet. A button panel or button panel and armrest structure is mounted at the lower end of the main door, and extends in a plane lying at an angle to the remainder of the main door so as to project outwardly from the cabinet when the main door is in the closed position. A lower door of the gaming machine has a lower end which is also pivotally connected to the cabinet so as to be pivotable with respect to the cabinet between a closed position and an open position. FIG. 1 shows a gaming machine 100 that also includes lower door 125 that pivots downwardly about pivot axis 126 to open. As will be described further below, doors 120 and 125 are configured so that a single latching mechanism associated with lower door 125 holds both doors in the closed position.

U.S. Pat. No. 7,513,830 (Hajder) relates to gaming machine cabinets and to the use of extendable displays to allow viewing and operation of the video display with the game machine cabinet door open. Many gaming machines, in particular those with flat-panel displays, have the flat-panel display mounted in the gaming cabinet door itself. When the door is opened, the display is no longer visible to technicians as they work on the interior components of the gaming machine. To solve this problem, the video display is pivotally mounted in the cabinet door to allow the video display to be released and rotated into a position viewable by the technician with the gaming cabinet door open. The monitor remains on the door when opened.

U.S. Pat. Nos. 7,627,613 and 6,997,810 (Cole) describes various gaming machine features and a slant-top type gaming machine. In one embodiment, a cabinet has a play area between an upwardly extending console and a supporting base portion. The console has an opening. A display and bezel are movable mounted to the console, blocking the opening in one position and allowing access to the opening in another. A game controller in the cabinet is accessible through the opening. The controller is mounted on a movable platform, allowing the controller to be moved into alignment with the opening. A ticket printer is located in the cabinet and expels tickets into a coin tray. Access doors provide access to a storage area defined by the supporting base portion. Monitor remains on door when opened.

U.S. Pat. No. 5,813,914 (McKay) describes a slant top video gaming cabinet including a top cap assembly having a display panel on a surface facing pedestrian traffic which includes means for efficient changeover. The cabinet is formed from sheet metal and allows economy in fabrication. In addition, the geometry of the cabinet promotes access only within sequestered areas by authorized personnel so that various components of the cabinet can be addressed only by appropriate personnel. The monitor and buttons are left in the cabinet when the panel is raised.

All cited documents are incorporated herein in their entirety by reference.

SUMMARY OF THE INVENTION

A electronic gaming cabinet for electronic gaming components with:

a main structural frame having a top, bottom, two opposed sides, a back, an open front and internal volume;

a front cover frame hinge on one opposed side;

the front cover frame having three openings, one for a top video display, one for a bottom video display and one for a player input panel, and the front cover frame freely opening from its closed position;

the internal volume having a first support for the top video display that allows slideable insertion and removal of the top video display monitor, and a second support for the bottom video display allowing slideable insertion and removal of the bottom video display monitor; and the internal volume having a processor supporting structure located lower within the internal volume than the top video display and at an equal or lower height than the bottom video display.

DETAILED DESCRIPTION OF THE INVENTION

Figure 1:
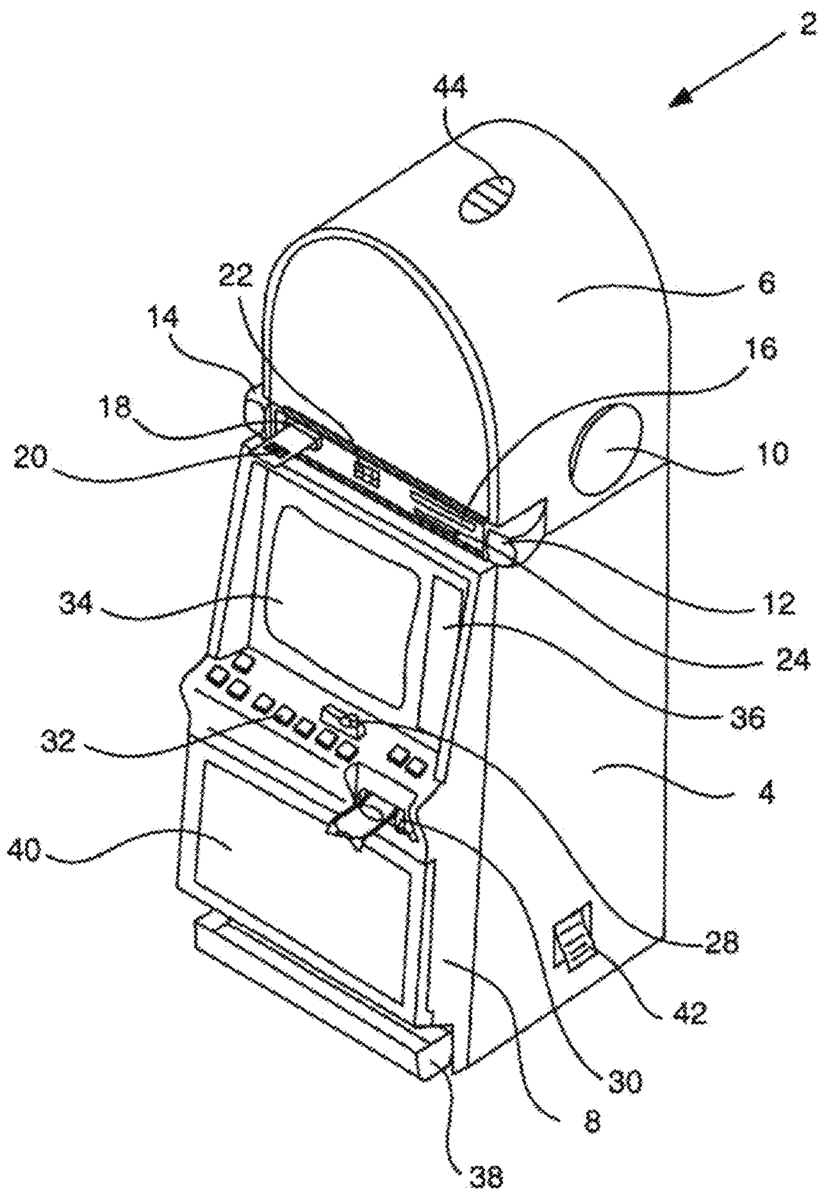
FIG. 1 shows a perspective view of a standard electronic gaming machine.

Turning next to FIG. 1, a video gaming machine 2 that may be used as the underlying base gaming counsel of the present invention is shown. Machine 2 includes a main cabinet 4, which generally surrounds the machine, interior (not shown) and is viewable by users. The main cabinet includes a main door S on the front of the machine, which opens to provide access to the interior of the machine. Attached to the main door are player-input switches or buttons 32, a coin acceptor 28, and a bill validator 30, a coin tray 38, and a display area including a mechanical gaming system (or less preferably a separate electronic game) 40. There may be an overlay of touchscreen functionality on the separate electronic game 40 or some of the buttons 32 may be functional on the separate mechanical gaming system 40. That separate mechanical gaming system may be in a relatively vertical viewing position as shown or in a more horizontal (table like) display unit. Viewable through the main door is a video display monitor 34 and an information panel 36. The display monitor 34 will typically be a cathode ray tube, high resolution flat-panel LCD, LED, plasma screen or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIG. 1. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed incorporating most any game of game play system presently known or developed in the future for gaming machines.

The inventor has determined a number of significant flaws in the underlying structure of gaming boxes in electronic gaming machines (EGM's) that has led to the observation by inventors that:

a) fundamental laws in structural design of the frame itself has allowed instability in the cabinet to impact durability of functional parts of electronic gaming machine;
b) access to internal elements of the electronic gaming machine has been poorly enabled, providing opportunities for damage to components when the machine is being serviced;
c) access to internal elements of the electronic gaming machine has been poorly enabled, causing delays and inconvenience in accessing components when the machine is being serviced;
d) secondary components have been poorly placed and aligned, causing poor ventilation and cooling of the system during use; and
e) available software and information reading functionality within the electronic gaming machine have been under-utilized and have not availed themselves of desirable functionality to improve the gaming experience.

A electronic gaming cabinet for use in housing electronic gaming components is enabled as having:

a main structural frame having a top, bottom, two opposed sides, a back, an open front and an internal volume. The main structural frame is made of a sturdy structural material, preferably metal such as steel, aluminum, stainless steel or plated steel, although composite materials with an attractive finish may be used.

There is a front cover frame hinge attached to one opposed side on the front of the main structural frame, the hinge allowing smooth or stepped opening of the cover frame and separation from underlying components without daming components (such as pulling against buttons or screens exposed through the openings in the front cover frame.

The front cover frame has at least two and preferably at least three openings, one for a top video display, one for a bottom video display and (optionally) one for a player input panel, and the front cover frame freely opening past 80 degrees from its closed position and preferably the front cover frame freely opens past 90 degrees from its closed position.

The internal volume has a first support for the top video display, the first support allowing slideable insertion and slideable removal of the top video display monitor, and a second support for the bottom video display, the second support allowing slideable insertion and slideable removal of the bottom video display monitor. The slides are preferably metal, although conductive or non-conductive composites may be used. The slides should comprises at least two parallel slide elements that extend towards the relatively upright sides (left and right sides) of the individual video displays.

The internal volume has a processor supporting structure (and when fully constructed, a processor) located lower within the internal volume than the top video display and at an equal or lower height than the bottom video display. The height of the internal components within the internal volume assists in allowing ease of repair or replacement access to the operative internal components. They may be as low as on the floor of the cabinet or elevated above the floor but below or at the level of the bottom video display to be more ergonomically located for repair work.

The internal volume allows unencumbered and direct access through the open front to the processor supporting structure through a frontal area of at least 900 square centimeters, preferably at least 1200 square centimeters and more preferably at least 1600 or at least 2000 square centimeters with both the height and the width of the open front exceeding 25 centimeters or exceeding at least 35 centimeters.

An open front cover allows open and independent (that is, each component in the following list may be accessed without moving another component) access to a receptor position for four internal components selected from the group consisting of an amplifier, a main motherboard, an Arduino board and a power outlet.

The electronic gaming cabinet may have the first support for the top video display as a slide support so that the top video display may be slid in to be secured into a stable position and slid out for removal of the top video display, and the second support for the bottom video display may be a slide support so that the bottom video display may be slid in to be secured into a stable position and slid out for removal of the bottom video display. The support may be a direct linear snap, so that the video displays may be pulled and pushed into a pressure locked (snap) secure position for removal. The video displays may have pins, contact, buss, USB or hardwired connections into the internal electronic communication links. If wired, the hard wiring to backs of the individual display units should be made before insertion and after partial removal from association with the cabinet.

The electronic gaming cabinet may have electronic links (through the pins, contact, buss, USB or hardwired connections) from the second support to the processor supporting structure to enable transmission of signals from a touchscreen component on the bottom video display to the processor.

The electronic gaming cabinet usually should have a locking mechanism on the main structural frame and an opposed engaging element on the front cover frame to mate with the locking element.

The electronic gaming cabinet preferably has the main structural frame is reinforced by at least two corner braces extending away from corners of the frame and that resist torsional movement in the cabinet from outside forces. The inventors have determined that one issue with electronic gaming devices has been their excessive wear and physical damage to components caused by rotational movement of the cabinet and forces transmitted to internal components such as the monitor(s), processors, ports, wiring, breadboards, motors, currency/ticket receivers, player control buttons, touchscreen films and the like.

Figures 2A, 2B, 2C:
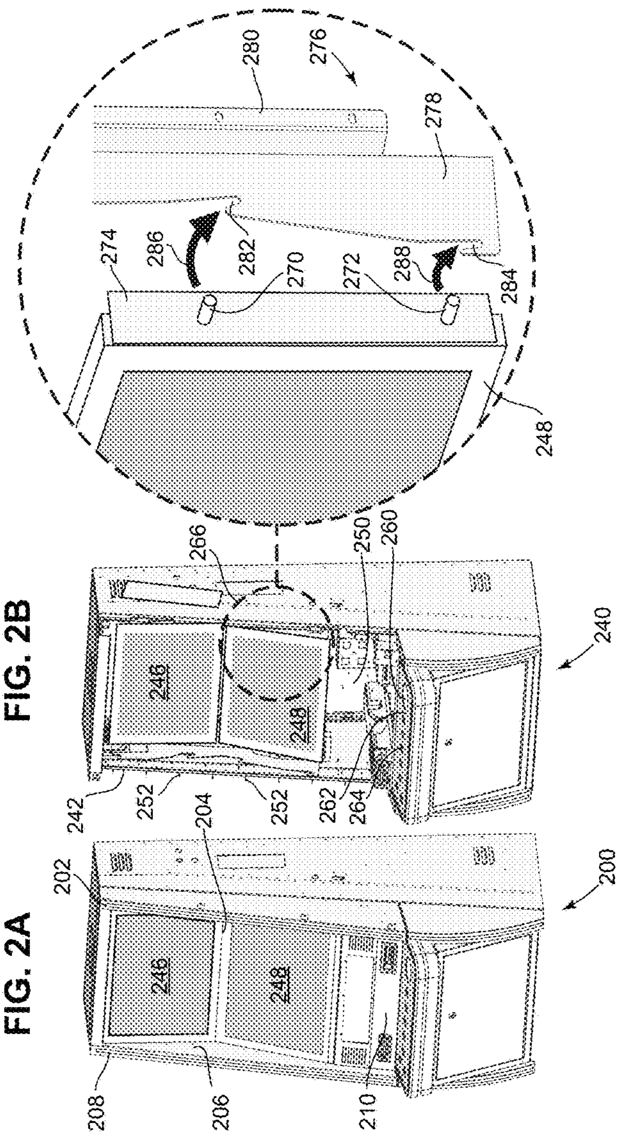
FIG. 2A shows a perspective view of a closed electronic gaming device.
FIG. 2B shows a perspective view of an opened electronic gaming device of the present technology with its front, sideways opening door or cover panel removed.
FIG. 2C shows a cutaway perspective view of a monitor useful within the electronic gaming machine of the present technology, with reinforcing pins and a pin stabilizing plate to be secured to a frame within the electronic gaming machine.

As shown in FIG. 2A, a perspective view of a cabinet 200 for an electronic gaming machine of the present technology is shown. The cabinet 200 is shown with the pivoting front cover 202 closed. The pivoting front cover 202 is shown with interior framing bars 204 that surround and assist in securing an upper display component 246 and a lower display component 248. There is an aesthetic and structural side plate 206 shown adjacent the pivoting edge 208 of the pivoting front cover 202. A player input panel 210 is also shown as integral to the pivoting front cover 202.

FIG. 2B shows a perspective view of the cabinet of FIG. 2A with the pivoting front cover (202 from FIG. 2A) swung open and removed from structural frame 242 of the opened cabinet 240. Hinge components 252 are shown where the pivoting front cover (202 of FIG. 2A) would pivot. The opening and removal of the front cover exposes an interior volume 250 within the opened cabinet 240 and the upper display component 246 and the lower display component 248. A player useful access arm 260 is shown with cup holder 262 and buttons 264. The buttons and access arm 260 may be part of the pivoting front cover 202 of FIG. 2A.

FIG. 2C shows an exploded and cutaway view of the circled portion 266 of FIG. 2. He lower display component 248 is shown (as a video display screen as further described herein) having a side support plate 274 secured to the lower display component 248. An upper, relatively horizontal support pin 270 and a lower, relatively horizontal support pin 272 are shown. These pins 270, 272 (which will be on both sides of the lower display component 248) are used to engage a display support plate 276 which is secured to the interior side of the opened cabinet 240. The upper, relatively horizontal support pin 270 moves along arc 286 to be securely nestled (by gravity and friction) into an upper support slot 282 in the forward portion 278 of the display support plate 276. The lower, relatively horizontal support pin 272 moves along arc 288 to be securely nestled (by gravity and friction) into a lower support slot 282 in the forward portion 278 of the display support plate 276. A structural securing arm 280 is used to secure the display support plate 276 to side walls of the cabinet. In the preferred embodiment shown, note that the lower support slot 284 in the forward portion 278 of the display support plate 276 is deeper than the upper support slot 282 in the forward portion 278 of the display support plate 276. With this configuration, the monitor may be slid slightly upwardly (and here also backwardly because of the pitch of the monitor 248), the upper, relatively horizontal support pin 270 disengaged from the upper support slot 282 in the forward portion 278 of the display support plate 276 while the lower support pin 272 remains engaged with the lower support slot 284 in the forward portion 278 of the display support plate 276. The top of the monitor 248 may then be rotated outwardly from the cabinet, and then the lower support pin 272 is disengaged from the lower support slot 284 in the forward portion 278 of the display support plate 276 to allow complete removal of the monitor from the cabinet 240. The back of the monitor (not shown) will have standard pin, cable, or wire connections into the electronic within the cabinet 240, and because of the partial separation of the monitor from the cabinet, those connections may be easily manually removed.

Figure 3:
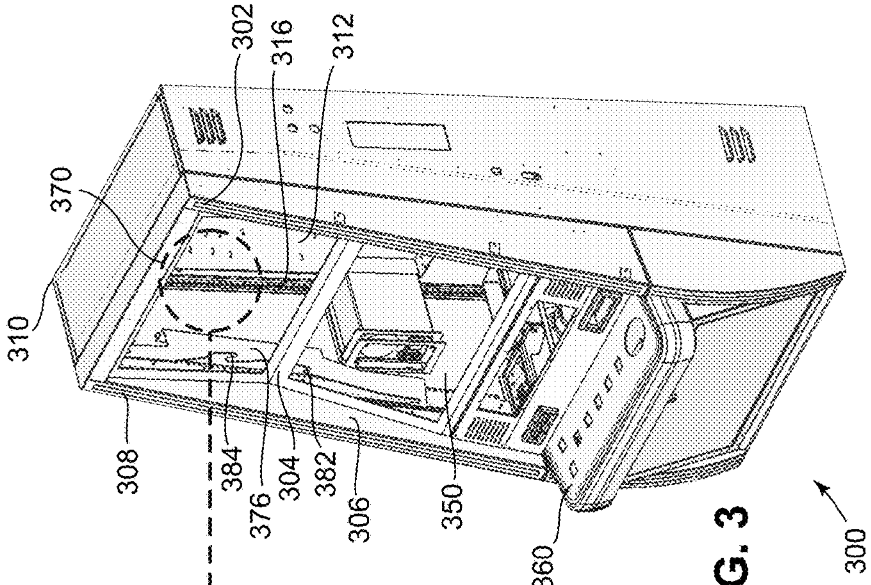
FIG. 3 shows a perspective view of an electronic gaming machine according to the present technology with the front panel and monitors removed to enable free viewing of the interior volume of the electronic gaming machine.

FIG. 3 shows a perspective view of an electronic gaming machine box or cabinet 300 that has been opened and the display panels removed to expose the interior volume 350 of the machine cabinet. An internal view 370 of a rear corner 310 of the frame 312 having an internal reinforcing structure 316 preferably having holes 396 (FIG. 3A) therein to reduce weight of the total cabinet without any significant reduction is torsion- or torque-reducing benefits. The arms 397, 399 of the internal reinforcing structure 316 is shown as forming a square with the sides 390, 392 of the external box. The arms may form a rectangle or other quadrilateral, especially forming an obtuse angle at the point 388 of the arms 397, 399 intersection. Therefore, the angles between the arms 397, 399 against internal faces of the sides 390, 392 of the external box preferably form at least a right angle, or an acute angle towards the point 388 of intersection.

An angle between the arms 397, 399 against internal faces of the sides 390, 392 of the external box that is less than a right angle, <90 degrees, may be used, but is less efficient than the at least 90 degree structure. Although the arms are shown as linear elements (which can simplify construction of the device), curved arms, especially oval or circular arc sections of a continuous element where ends of the arc again preferably form at least right angles against internal faces 390, 392 of the sides of the external box 300.

Also shown within the internal volume are the monitor support plate 376 with its upper pin support slot 384 and the lower pin support slot 382, repeating the disclosure above in FIG. 2. Similarly the structural and aesthetic side panel 376 and the player support surface 360 are shown.

Figure 3A:
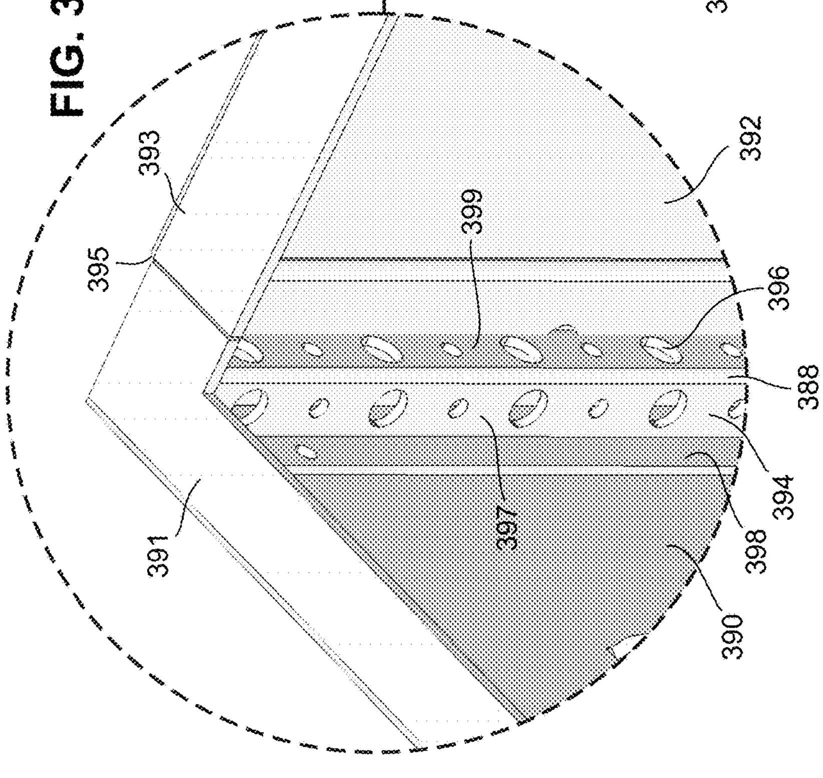
FIG. 3A shows a perspective view of a structural corner of a game box with a torsion resisting reinforcement in a corner with weight reducing holes along vertical slats forming the torsion reducing reinforcement.

FIG. 3A shows a cutaway view representing the circled inside area 370 highlighted in FIG. 3. FIG. 3A shows the left side 390 and the right side 392 panels for the left hand corner (310 in FIG. 3). Top edges 391 and 393 of the respective left side 390 and the right side 392 panels abut and are secured at joint 395. The reinforcing structural element 394 enabled by the present technology is secured (preferably welded, adhesively secured or fused, but it be bolted to the left side 390 and the right side 392 panels. The left side face or arm 397 of the reinforcing structural element 394 forms an angle at the meeting point or line or corner 388 with the opposed right side face or arm 399 of the reinforcing structural element 394. The holes or openings 396 are shown as reducing the total weight and cost of materials for the reinforcing structural element 394 without sacrificing the reinforcing torsion-resistant benefits of the reinforcing structural element 394. A further extension of the reinforcing structural element 394 is shown as a flange 398 which may be on one or both sides of the reinforcing structural element 394. The flange may also extend completely underneath the reinforcing structural element 394.

This form of reinforcement reduces the effect of torque on the external box and its internal components. The torque-effect reduction also reduces the torsion experience of the box and its internal components. With the reduced torsion, there is less movement of the sides of the box and less stress applied to internal components, less movement of internal components and reduced likelihood of internal components striking each other or being abrasively moved against each other.

The material and construction of this internal corner braces or reinforcement element can be varied in a number of ways to benefit additional features of the technology. The material used for the corner brace is preferably metal, particularly light-weight metal, composite materials, fiber-reinforced materials, and the like. The metal may be steel, stainless steel, and aluminum, with steel compositions preferred. To keep weight low, without sacrificing the need for torsion reduction, the material of the corner brace should be provided with openings in the structure (as indicated by 396 in FIG. 3A).

There is an additional benefit to the use of the corner brace in the practice of the present technology. By reducing the impact of torque and strengthening the major supporting corners (e.g., at least the back two corners of the electronic gaming machine), the structural material for the sides (e.g., 390 and 392) may also be reduced in weight. The steel (e.g., typically used is stainless steel or layered steel having a total gauge of at least 4 or less Metal gauge size is generally determined as:

| Gauge | Minimum Thickness (in.) |
|---|---|
| 3 | 0.2391 |
| 4 | 0.2242 |
| 5 | 0.2092 |
| 6 | 0.1943 |

Thus, the larger the gauge, the thinner the material. Therefore, the thickness of the metal in the sides of the EGM may and preferably is less than 0.2200 inches. This reduction is thickness over standard EGM sides not only significantly reduces weight of the entire machine, but saves significant manufacturing costs in the reduction of materials. The fact that the strength of the sides themselves can be reduced, while the integrity of the entire game box is maintained and even improved by the use of the corner brace.

The holes in the vertically extending elements (e.g., flat faces) may cover at least 10%, at least 20%, at least 30% and up to 75% of the entire surface area of each vertically extending element along at least 20% of the length of the element.

The electronic gaming cabinet preferably has the first support for the top video display is a slide support so that the top video display may be slid in to be secured into a stable position and slid out for removal of the top video display and the second support for the bottom video display is a slide support so that the bottom video display may be slid in to be secured into a stable position and slid out for removal of the bottom video display, the first support and the second support having a relative orientation so that either one of the top video display or the bottom video display may be slid from respective supports while the other of the video displays is present in its respective support.

The monitors, at least one of the monitors, should be easily and individually removable without the need for loosening screws or bolts has also been uniquely designed into the EGM in the present technology. This was exemplified by reviewing the perspective view of FIGS. 2A, 2B and 2C. A monitor system is shown with a monitor having a frame and side support pins. The pins are is seated in a locking/engaging support which has a vertically extending toe and a vertically or hooked heel that forms respective openings at the toe and an opening at the heel. The monitor also may be supported by the back support, such as a flat surface support or cushioning element. When the pin is seated or snapped into the respective opening at the toe and heel, the monitor is secure and stable within the housing. When the monitor is moved upward and the pin is disengaged from the locking support 308, the monitor is slid upwardly and then may have the top 320 of the monitor 302 rotated forward and lifted up to expose the back of the monitor and components behind the monitor. The full monitor and frame may be lifted and any pins, cables or electronic connections to and from ports in the monitor may be easily disengaged for complete removal of the monitor and completely exposed access to the components within the box.

If the monitor first removed is a lower of at least two monitors, the top of the monitor must be moveable upwardly to disengage the pin from the locking/engaging pin supports (on both sides of the monitor in its frame) with sufficient clearance from a bottom of a higher monitor (not shown) so that disengagement can be completed and the monitor removed without damaging the higher monitor.

It is desirable for the second monitor to also be disengageable without the use of screws, bolts and the like. A similar arrangement like that on the first monitor may be used on the second monitor.

Another novel feature that can be used in the EGM alone or in combination with other novel technologies enabled herein is the use of an automatic language recognition system in combination with the player card, charge card, player code entry or the like. Upon entry of any form of data by the player into input controls or currency control component on the system, The processor reading the input identifies language content or country identification embedded in information on the card, the processor triggers access to memory associated with the specific recognized language and/or country, and changes or maintains the language portrayed on the screen to a language and/or graphics stored in memory. By indication of graphics, languages that do not use the Roman alphabet (e.g., Russian, Chinese, Korean, Arabic, etc.) or have special tonal or accent marks (e.g., French, Spanish, German, etc.) can be accessed to elevate the language displayed to the most complete format.

Any realistic number of languages and matching graphics may be used, with a minimum of three languages desired and up to 25 languages being desirable in memory. The number is preferably at least 3, 4, 5 or 6 up to 25 or more languages.

The external frame of the cabinet, particularly on the most forward face of the edges of the frame (e.g., top, left face and right face and possibly an edge at the player panel level) may have a transparent or translucent tubing containing multi-colored lighting elements, such as LED lights. There should be at least two different color lights, and preferably at least three (e.g., red, yellow and blue and/or green) different colors so that a range of colors, range of tones, range of intensities and virtual movement of the lights. These lights may be coordinated with different game events and outcomes, not only for entertainment purposes, but also for providing casino personnel with immediate and visible information. The lights can show virtual movement by sequential lighting of same color lights or combinations of lights along a linear path on the tube or casing. For example, when the machine is inactive (e.g., with no credits), the lights may be a specific color or tone (e.g., white) that indicates inactivity. Other indicators, such as a pulsing white or red may be used. When credit is made available to the machine and the machine is or is capable of active game play, a different light display is automatically indicated by the processor and implemented on the surrounding line of lights. During normal play, for example, a color pattern more indicative of a steady state of play would be provided, such as a steady movement of lines of lighting.

When a minor payout is provided, a modest change in patterns, such as flashing of the steady state colors may be provided. An important new feature in this venue is to provide a special indication of the presence of free plays by a special light display. Free plays are desirable for players and have been an attractive addition or players, but casinos find free plays debatable and would like to be actively aware of their frequency of occurrence. This is because free play time cannot possibly increase casino hold on the EGM. During that time period, no value is at risk for the player.

Other special events, such as alternative bonus rounds, jackpots, multiplier events and the like will also have unique color indicating patterns.

The EGM of the present technology may be either server-based without a random number generator (RNG) and function as a Class II gaming device or may engage wagering event play with a contained RNG, thereby functioning as a Class II gaming device. The present EGM may have external communication ports and inter-gaming device connectivity to enable switching from one mode to the other.

What is claimed:

1. A electronic gaming cabinet for use in housing electronic gaming components, the cabinet comprising:

a main structural frame having a top, bottom, two opposed sides, a back, an open front and an internal volume;

a front cover frame hinge attached to one opposed side;

the front cover frame having three openings, one for a top video display, one for a bottom video display and one for a player input panel, and the front cover frame freely opening past 80 degrees from its closed position;

the internal volume having a first support for the top video display, the first support allowing slideable insertion and slideable removal of the top video display monitor, and a second support for the bottom video display;

the internal volume having a processor supporting structure located lower within the internal volume than the top video display and at an equal or lower height than the bottom video display;

the internal volume allowing unencumbered and direct access through the open front to the processor supporting structure through a frontal area of at least 900 square centimeters, with both the height and the width of the open front exceeding 25 centimeters; and an open front cover allowing open and independent access to a receptor position for four internal components selected from the group consisting of an amplifier, a main motherboard, a control board and a power outlet.

2. The electronic gaming cabinet of claim 1 wherein the second support allows slideable insertion and slideable removal of the bottom video display monitor.

3. The electronic gaming cabinet of claim 1 wherein the first support for the top video display is a slide support so that the top video display may be slid in to be secured into a stable position and slid out for removal of the top video display.

4. The electronic gaming cabinet of claim 1 wherein the second support for the bottom video display is a slide support so that the bottom video display may be slid in to be secured into a stable position and slid out for removal of the bottom video display.

5. The electronic gaming cabinet of claim 4 wherein there are electronic links from the second support to the processor supporting structure to enable transmission of signals from a touchscreen component on the bottom video display to the processor.

6. The electronic gaming cabinet of claim 1 further comprising a locking mechanism on the main structural frame and an opposed engaging element on the front cover frame to mate with the locking element.

7. The electronic gaming cabinet of claim 1 wherein the front cover frame freely opens past 90 degrees from its closed position.

8. The electronic gaming cabinet of claim 1 wherein the main structural frame is reinforced by at least two internal corner braces extending vertically at a back left inside corner and a back right inside corner of the cabinet, the right and left inside corners formed by a back surface meeting a respective left side panel and respective right side panel.

9. The electronic gaming cabinet of claim 8 wherein ends of the two internal corner braces form angles of 90 degrees or less with the left side panel and right side panel at the left and right inside corners.

10. The electronic gaming cabinet of claim 8 wherein the corner braces have spaced holes along their vertical extension.

11. The electronic gaming cabinet of claim 10 wherein the spaced holes cover at least 10% of total surface area along at least 10% of the vertical extension of the corner braces.

12. The electronic gaming cabinet of claim 1 wherein the first support for the top video display comprises a pin snapped into a slide support so that the top video display may be slid in to be secured into a stable position and slid out for removal of the top video display.

13. The electronic gaming cabinet of claim 1 wherein the second support for the bottom video display comprises a pin snapped into a slide support so that the bottom video display may be slid in to be secured into a stable position and slid out for removal of the bottom video display.

14. The electronic gaming cabinet of claim 12 wherein the first support and the second support having a relative orientation so that either one of the top video display or the bottom video display may be slid from respective supports while the other of the video displays is present in its respective support.

15. The electronic gaming cabinet of claim 12 wherein the spaced holes cover at least 10% of total surface area along at least 20% of the vertical extension of the corner braces.

16. The electronic gaming cabinet of claim 13 wherein the spaced holes cover at least 10% of total surface area along at least 30% of the vertical extension of the corner braces.

17. The electronic gaming cabinet of claim 14 wherein the spaced holes cover at least 10% of total surface area along at least 30% of the vertical extension of the corner braces.

18. An electronic gaming cabinet having a main structural frame having a top, bottom, two opposed sides, a back, an open front and an internal volume;

a front cover frame hinge attached to one opposed side;

the front cover frame having three openings, one for a top video display, one for a bottom video display and one for a player input panel, and the front cover frame freely opening past 80 degrees from its closed position;

the internal volume having a first support for the top video display, the first support allowing slideable insertion and slideable removal of the top video display monitor, and a second support for the bottom video display;

the internal volume having a processor supporting structure located lower within the internal volume than the top video display and at an equal or lower height than the bottom video display;

the internal volume allowing unencumbered and direct access through the open front to the processor supporting structure through a frontal area of at least 900 square centimeters, with both the height and the width of the open front exceeding 25 centimeters; and a front cover which when open allows open and independent access to a receptor position for four internal components selected from the group consisting of an amplifier, a memory, a main motherboard processor, and a power outlet, wherein:

a) the memory contains graphic capability to display information on the at least one video display in at least three different languages;

b) the information card reading port in communication with the main motherboard processor capable of distinguishing identity among the at least three different languages; and c) the main motherboard processor configured to maintain graphics or alter graphics into a distinguishing identity obtained by the information card reading port in communication with the processor.

19. The electronic gaming cabinet of claim 18 wherein the memory contains at least ten different languages and at least two different alphanumeric graphics, with at least one alphanumeric graphic corresponding to at least one of the ten different languages that has an alphabet other than Roman alphabet.

* * * * *